(12) United States Patent
Drocco (10) Patent No.: US 9,907,313 B2
(45) Date of Patent: Mar. 6, 2018

(54) SYSTEM FOR OVERTURNING TANKS OF KNEADING MACHINES

(71) Applicant: Sancassiano S.p.A., Roddi d'Alba (Cuneo) (IT)

(72) Inventor: Davide Drocco, Alba (Cuneo) (IT)

(73) Assignee: Sancassiano S.p.A., Roddi d'Alba (Cuneo) (IT)

( * ) Notice: Subject to any disclaimer, the term of this patent is extended or adjusted under 35 U.S.C. 154(b) by 0 days.

(21) Appl. No.: 15/253,479

(22) Filed: Aug. 31, 2016

(65) Prior Publication Data

US 2017/0055536 A1    Mar. 2, 2017

(30) Foreign Application Priority Data

Sep. 2, 2015  (IT) .................. 102015000047869

(51) Int. Cl.
| | | |
|---|---|---|
| *A21C 1/14* | (2006.01) | |
| *B66F 9/02* | (2006.01) | |
| *A21C 1/00* | (2006.01) | |
| *B65G 65/23* | (2006.01) | |
| *B08B 1/00* | (2006.01) | |

(52) U.S. Cl.
CPC ............ *A21C 1/1445* (2013.01); *A21C 1/006* (2013.01); *B08B 1/00* (2013.01); *B65G 65/23* (2013.01); *B66F 9/02* (2013.01)

(58) Field of Classification Search
CPC ....... A21C 1/1445; A21C 1/006; A21C 1/144; A21C 1/1455; A21C 1/146; B65G 65/23
See application file for complete search history.

(56) References Cited

U.S. PATENT DOCUMENTS

| | | | | |
|---|---|---|---|---|
| 1,587,593 | A * | 6/1926 | Lasch .................. | A21C 1/1445 |
| | | | | 222/166 |
| 1,685,186 | A * | 9/1928 | Aeschbach .......... | A21C 1/1445 |
| | | | | 366/70 |
| 8,739,696 | B2 * | 6/2014 | Anderson ................ | A21C 1/02 |
| | | | | 425/307 |
| 9,089,147 | B2 * | 7/2015 | Maile ..................... | A22C 11/02 |
| 2015/0296844 | A1 * | 10/2015 | Vaz Camara ....... | B01F 7/00033 |
| | | | | 99/358 |

FOREIGN PATENT DOCUMENTS

WO     2014/027335 A2    2/2014

OTHER PUBLICATIONS

Italian Search report, dated May 12, 2016, for corresponding Italian Patent Application No. IT UB20153351.

* cited by examiner

*Primary Examiner* — Kaitlin S Joerger
(74) *Attorney, Agent, or Firm* — Heslin Rothenberg Farley & Mesiti, P.C.; Victor Cardona, Esq.

(57) ABSTRACT

A system for overturning tanks, in particular tanks of kneading machines, includes a vertical supporting structure, an overturning unit, which is mobile along the structure between a lowered position and a raised position and can turn about an axis transverse to the vertical direction, and a system for driving the movement of said unit between said lowered position and said raised position. A further actuation system is provided for governing the movement of rotation of said unit independently of said movement between said lowered position and said raised position.

19 Claims, 7 Drawing Sheets

SYSTEM FOR OVERTURNING TANKS OF KNEADING MACHINES

CROSS REFERENCE TO RELATED APPLICATIONS

This application claims priority from Italian Patent Application No. 102015000047869 filed on Sep. 2, 2015, the entire disclosure of which is incorporated herein by reference.

The present invention relates to a system for overturning tanks, in particular tanks of kneading machines, the system being of the type comprising:
- a supporting structure; and
- an overturning unit, which is mobile along the aforesaid structure, between a lowered position and a raised position and can turn about an axis transverse to the direction of raising of the unit.

The above type of system is used for unloading the dough prepared in kneading machines equipped with extractable tank. This unloading operation envisages removal of the tank from the kneading machine and transfer thereof to the overturning system in question, which raises the tank and turns it over onto user or conveying means for unloading the dough onto the latter.

In systems of the type in question so far known, the two movements of raising and overturning performed by the mobile unit of the system are implemented through one and the same kinematic chain driven by a single actuator. In particular, the movement of rotation is performed via appropriate mechanical means, cams, levers, and pins that exploit raising/lowering of the unit in order to induce a corresponding movement of rotation.

The object of the present invention is to provide an overturning system that will be improved as compared to the known systems referred to above, both from the standpoint of a simplification of the structure and as regards its operation.

The object referred to above is achieved by a system presenting the characteristics specified in claim 1. The present invention also relates to a method for turning over a tank according to claim 14.

The claims form an integral part of the technical teaching provided herein in relation to the invention.

The system described herein stems from the observation that in order to guarantee that, at the end of the unloading step, the quality of the dough will continue to be the desired one, preventing it from possibly suffering degenerative effects on account of the aforesaid step, it is necessary to identify specific procedures of overturning of the tank according to the type of dough that is to be unloaded. The present applicant, in fact, has found that some types of dough need to be unloaded with wide angles of overturning and at high speeds, whereas other types of dough require smaller angles of overturning and lower speeds. It is hence necessary to change the unloading modalities for adapting this step to the specific needs of the various recipes. It should be noted on the other hand that some types of doughs need to be unloaded more delicately than others, so that for this purpose it is envisaged that the dough is substantially rested onto the means provided for receiving it. Furthermore, the present applicant has noted that, once again in order not to jeopardize the quality of the dough, it is advantageous to be able to vary the height and/or modalities of overturning of the tank according to the receiving means provided in the individual cases so as to be able to adapt the unloading process to the means envisaged, causing the dough to be substantially subjected always to one and the same falling movement.

In the light of the foregoing, the present applicant has hence devised a system of the type referred to that is characterized in that it presents two distinct and independent actuation systems, one designed to govern the movement of raising/lowering of the mobile unit of the system, and the other to govern the movement of rotation. As will be seen in what follows, this configuration affords the possibility of modifying the process of overturning of the tank according to the specific applications, for the purposes referred to above.

Further characteristics and advantages of the invention will emerge clearly from the ensuing description, with reference to the annexed drawings, which are provided purely by way of non-limiting example and in which.

In the ensuing description, various specific details are illustrated, aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

In general, the system described herein, designated in the figures by the reference number 10, comprises a supporting structure 2, which has a global configuration of a column or pillar type, supported vertically and laterally, respectively, by appropriate bases and side supports. The system further comprises an overturning unit 4 that is mobile along the aforesaid structure between a lowered position and a raised position and is able to rotate about an axis transverse to a generic vertical reference direction. The unit 4 is configured for receiving and connecting to itself the tank V of a kneading machine and, via its two movements, has the function of raising the tank and turning it over in order to unload the dough contained therein. The devices or members via which the unit 4 can engage and secure the tank to itself may be of any known type and consequently are not described herein in detail.

In various preferred embodiments, as in the one illustrated, set on the structure 2 is a chain-movement system driven by an electric motor (in the figures, the system is designated as a whole by the reference number and the motor is designated as a whole by 6a), associated to which is the unit 4 and which is designed to govern the movement of raising and lowering of the aforesaid unit. The travel of the aforesaid movement is delimited between a lower position, in which the unit 4 receives the tank and then releases it after the dough has been unloaded, and a maximum raised position, which is the position of maximum height that can be reached on the structure 2 by the unit. This second position is usually constrained by the limits of encumbrance imposed on the structure 2 by the various applications. In general, it may in any case be noted that the greater the travel that the unit 4 can perform, the greater the number of applications of the system.

The unit 4 is associated to the chain-movement system by way of a slide 8, which is connected to the chain means of the aforesaid system and is slidably mounted on a series of guides carried by the structure 2.

The unit 4 is in turn mounted on the slide rotatably about a horizontal axis R and may be moved in rotation about the aforesaid axis by being driven by a second movement system, which is specifically dedicated to the aforesaid movement of rotation and can operate in a way altogether independent of the chain-movement system. In various preferred embodiments, as in the one illustrated, the unit 4 is mounted about the axis R in such a way that the latter is located below the bottom of the tank V connected to the unit 4. For this purpose, the unit 4 is clearly configured for receiving and engaging the tank V appropriately so that the axis R will always remain in a position below the bottom of any tank V that is connected to the unit 4. This arrangement makes it possible to obtain extensive movements of overturning of the tank, in terms of angular extension, but at the same time limiting the surrounding free space, necessary for obtaining the aforesaid movement. A direct advantage is hence that it is possible, according to the needs, to set the tank as much as possible up against the means for collecting the dough, thus limiting the height of fall of the dough and consequently the impact that it has to undergo.

Figure 1:
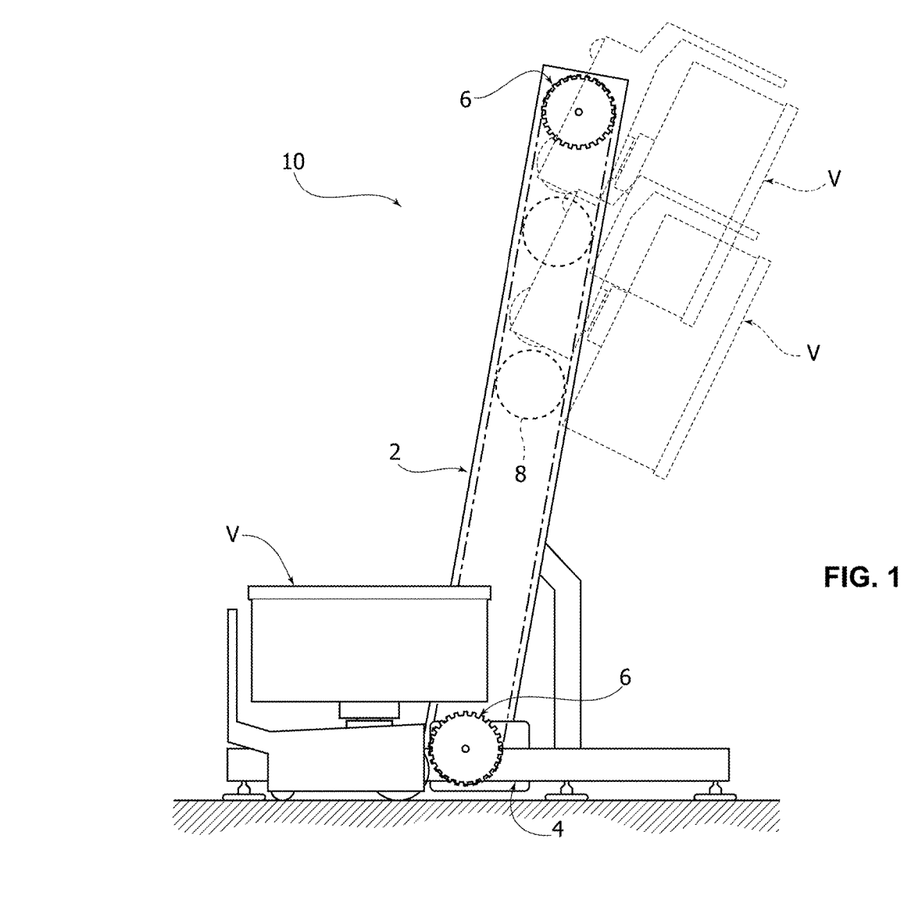
FIG. 1 is a schematic illustration of an embodiment of the system described herein.
Figure 2:
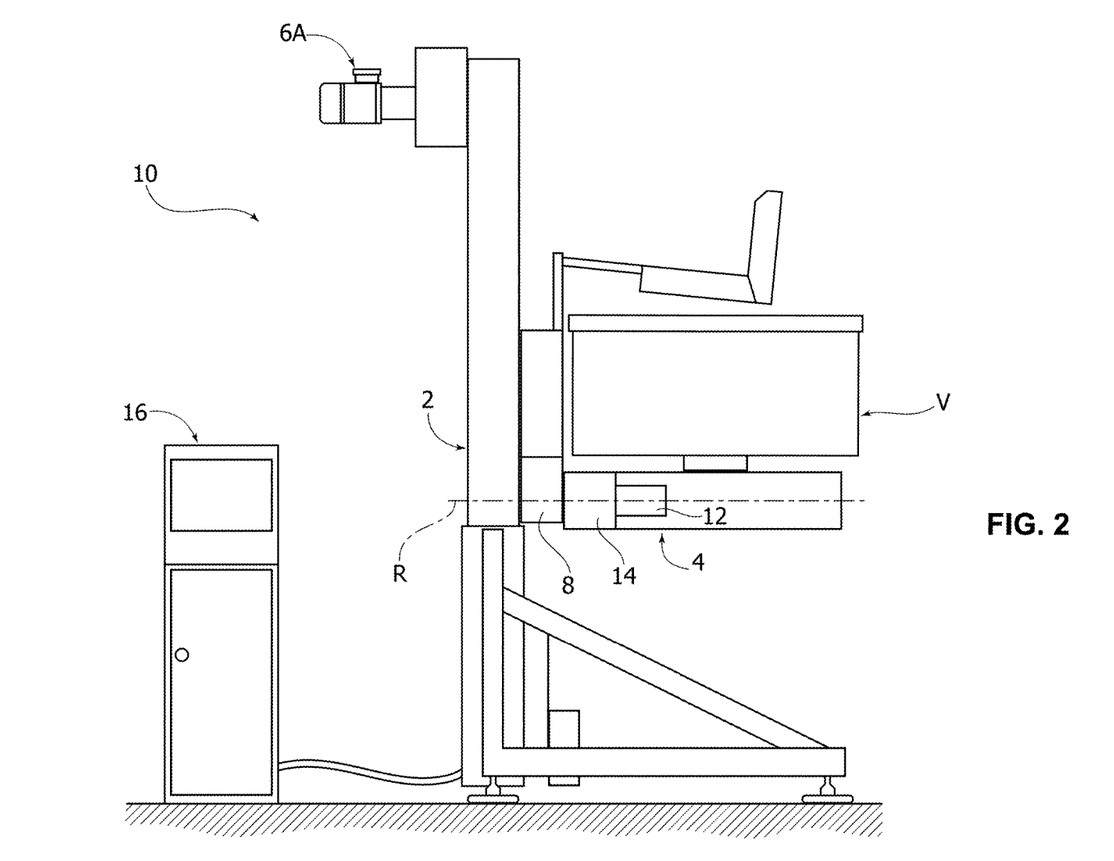
FIG. 2 illustrates the system of FIG. 1 according to a lateral view.
Figure 3:
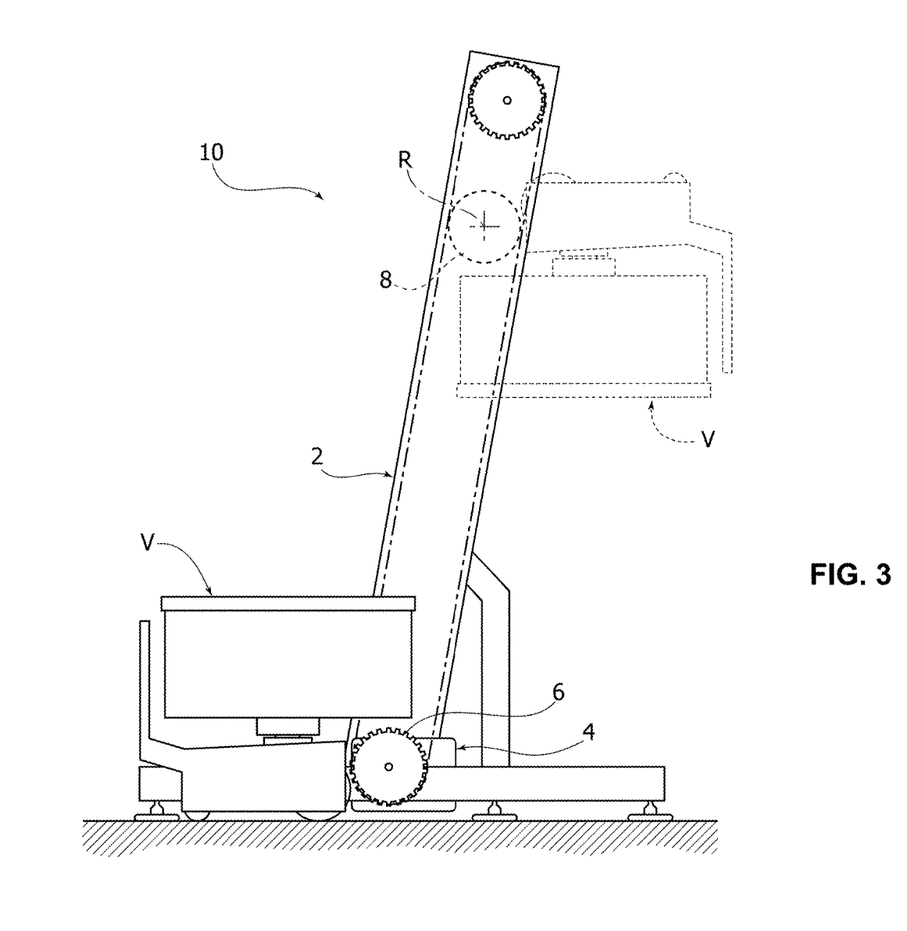
FIGS. 3-4 illustrate the system of FIG. 1 in different operating conditions.

In various preferred embodiments, the aforesaid second system comprises an electric motor 12 and a set of gears 14 for transmission of the motion from the motor to the unit 4 (see FIG. 2). In various preferred embodiments, the aforesaid system comprises a motor, associated to which is a reducer. In any case, the second system may also envisage alternative actuation means, for example pneumatic ones, hydraulic ones, etc.

The system described herein is equipped with control means configured for governing the two movement systems referred to.

In this connection, to return for a moment to the systems of a known type discussed at the start, it should be noted that the latter can only perform just one and the same procedure of overturning of the tank, characterized by a rigid and immutable combination of vertical movements and movements of rotation given that the aforesaid systems envisage a single kinematic chain that governs both of the movements. Purely by way of reference, it should be considered that, in a traditional system, overturning of the tank usually proceeds according to the following steps:

raising the tank to a pre-set height, which is invariable;
 raising further the tank beyond the aforesaid pre-set height, this simultaneously inducing a movement of rotation of the tank, in the direction of overturning, which is linked by a given transmission ratio to the raising movement; and
 stopping raising the tank, this also causing arrest of rotation of the tank.

Also return of the tank into its lowered position is characterized by a corresponding series of movements of translation and rotation that are intimately connected.

Instead, as emerges from the foregoing, in the system described herein the two movement systems described above, which are designed, respectively, to govern the motion of raising/lowering and the motion of rotation of the unit 4, are altogether independent from the standpoint of their respective kinematic chains, and hence it is possible to vary one or more parameters of the respective movements independently in the two systems, according to the specific applications in which the system is operating. This means that the motion of raising of the unit and its motion of rotation can overlap and/or alternate according to variable times and modalities. As will be seen in what follows, the present applicant has in any case in general found that the best modality of unloading of the dough is obtained via a combined movement, on the part of the unit 4, of translation and rotation. In the aforesaid unloading mode, the advantages deriving from the double motor drive of the system lie in the fact that it is possible, thanks to the aforesaid configuration, to regulate independently the speed and acceleration of the two movements and also regulate the final angle of overturning of the tank.

The control unit of the system described herein can hence be configured for governing different operating modalities.

In various preferred embodiments, the control unit is in particular configured for regulating one or more parameters of the two movements in question in a way that varies according to the type of dough to be unloaded.

In various preferred embodiments, the control unit comprises a programming module on which the operator can intervene for setting the kind of operating procedure of the system. In general, via the programming module in question, for each of the two movement systems described it is possible to set at least one of the following parameters: position, activation/deactivation times, duration, speed, acceleration, deceleration, etc. Preferably, the control unit is integrated within a control station 16 provided at a side of the structure 2 (see FIG. 2), which is provided for control of the system by the operator.

In various preferred embodiments, the programming module is configured for executing a program of selection of the dough that proposes a list of different types of dough among which the operator can select the desired one. In various embodiments, as in the one illustrated, the list furnished has types of dough that are differentiated from one another for one or more physical or rheological characteristics, in particular, density, viscosity, elasticity, etc.

It should moreover be noted that the present applicant has conducted a series of experiments for identifying the modalities for unloading dough that are most suited to the different types of dough so as not to damage or jeopardize the physical characteristics thereof, on the one hand, and to optimise the process times and speeds, on the other. By means of these activities, the present applicant has identified the following parameters for distinguishing, from the standpoint of the process, the modes of unloading of the dough for specific different types of dough:

the parameter K, given by $$K=Y/\alpha$$

where
 Y is the speed of raising of the unit 4; and
 $\alpha$ is the speed of rotation of the unit
 the parameter $\Omega$—represented also in FIG. 5b—corresponding to the angle of total rotation of the movement of overturning of the tank, i.e., to the final overturning angle.

In general, the present applicant has found that, for the purposes referred to above, the greater the density of the dough, the higher must be the value of K and, instead, the lower the value of $\Omega$.

For instance, for low-density doughs, in particular with a density of between 0.3 kg/dm³ and 0.8 kg/dm³, the present applicant has obtained the best results for values of K between 5 and 10 mm/degree and values of Ω between 120° and 170°. For high-density doughs, in particular with a density of between 1 kg/dm³ and 1.2 kg/dm³, the best results have been obtained with K between 10 and 20 mm/degree, and values of Ω between 100° and 120°.

For intermediate-density doughs, compromise solutions between the ranges referred to above have proven optimal.

As mentioned above, via the system described herein it is in any case possible to obtain a wide range of modes of unloading of the dough.

For instance, in various preferred embodiments, the control means are configured for obtaining procedures of overturning of the tank comprising one or more of the following combinations of movements:
- raising the tank and then rotating it in the overturning direction while, at the same time, the raising movement is not being driven;
- turning the tank in the overturning direction and then raising it while, at the same time, the movement of rotation is not being driven;
- turning the tank in the overturning direction and then lowering it while, at the same time, the movement of rotation is not being driven;
- accelerating the rotation of the tank and at the same time reducing the speed of raising or lowering of the tank;
- reducing the speed of rotation of the tank and at the same time increasing the speed of raising or lowering;
- increasing or reducing the final angle of overturning of the tank.

According to the type of dough to be unloaded, the control means can govern one or more of the movements referred to above. For instance:
- raising the tank;
- turning the tank in the overturning direction while the raising movement is not being driven;
- raising the tank further and simultaneously driving the movement of rotation;
- lowering the tank while the movement of rotation is not being driven so as to accompany the dough onto the means provided for receiving it, without getting it to make excessive jumps. Possibly, the aforesaid procedure may also envisage introducing in the tank the scraper carried by the overturning unit and setting the tank in rotation so that the scraper is able to act on the entire perimeter of the inner surface of the tank in order to guarantee complete removal of the dough that may still have remained inside.

The succession of movements and pauses referred to above enables transfer of the dough from the tank to the collecting means with a movement of the dough in which this is practically delicately rested and laid out on the collection means. Once again by way of example, it is likewise possible to envisage the following succession of movements:
- raising the tank;
- turning the tank in the overturning direction while the raising movement is being driven; and
- accelerating rotation of the tank during the final overturning phase.

As compared to the previous one, the aforesaid overturning procedure is characterized in that it is faster even though less "delicate" in regard to the dough being unloaded.

Apart from the possible modalities of overturning of the tank, via the control means of the system it is also possible to set the height at which to carry out the overturning operation on the basis of the type of line that is to receive the dough in order to adapt the system and its operation to the various lines for treatment of the dough that may be envisaged. In this regard, it should be noted that, in general, in the case where hoppers are provided for collection of the dough being unloaded, the unit 4 must reach heights greater than in the case where conveyor belts or else simple collection tables are, instead, provided.

Figure 4:
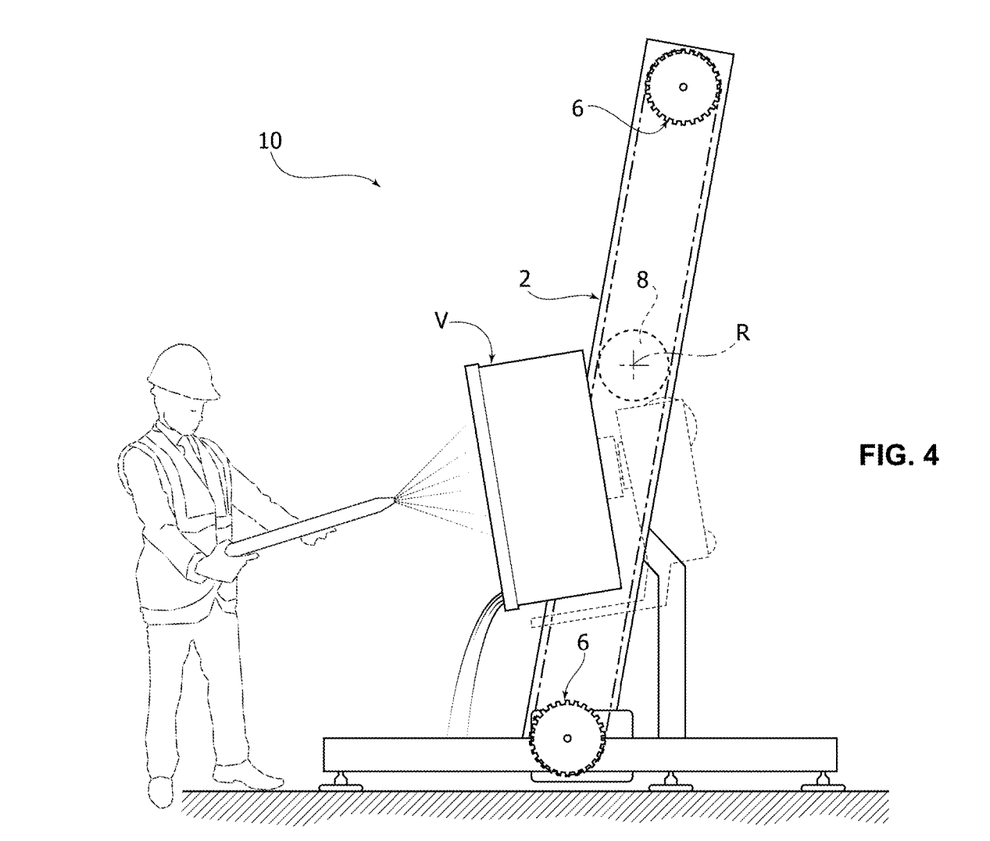

Again, in the system described herein it is possible to envisage, via the control means in question, that the tank is turned over in a direction opposite to the one in which it is turned over for unloading the dough (see in this connection FIG. 4), in order, for example, to unload a discarded product onto a purposely provided disposal line set adjacent to the system, or else in order to carry out an operation of flushing of the tank, preventing any residue left by this operation from possibly falling onto the line on which the dough undergoes treatment. The aforesaid operation of unloading any discarded product and the flushing operation can then be carried out in any vertical position of the unit according to the specific operating needs.

Figure 5A:
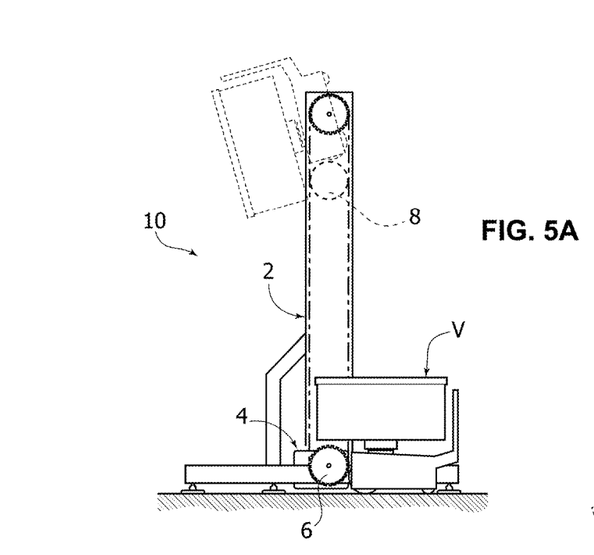
FIGS. 5A-5C illustrate the system of FIG. 1, in which the supporting structure is installed according to three respective different inclinations with respect to the floor surface.
Figure 5B:
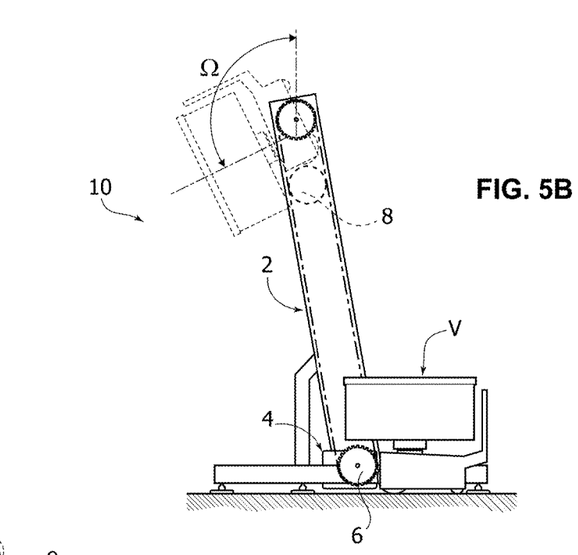
Figure 5C:
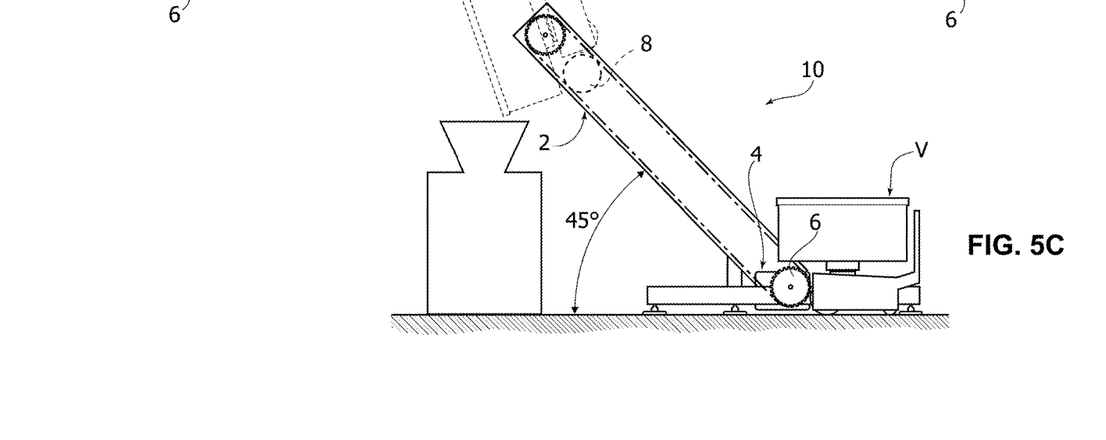

With reference now to FIGS. 5A-5C, these highlight the possibility by the system described herein to vary orientation of the structure 2 with respect to the vertical employing appropriate supporting members that support the aforesaid structure laterally. The above members have a configuration dedicated to a respective inclination of the structure 2, and it is possible to envisage a series of these members for the different inclinations that are required, as well as to interchange them according to the inclination envisaged in the specific applications. Preferably, the structure 2 can be oriented with respect to the vertical direction by an angle of between 0° and 45°. As may be seen in FIG. 5c, particularly sharp inclinations—of about 45°—also enable a substantial displacement of the tank in the horizontal direction to be obtained merely via the movement of raising of the overturning unit 4, thus avoiding the use of translating hoppers or conveyor belts.

Figure 6A:
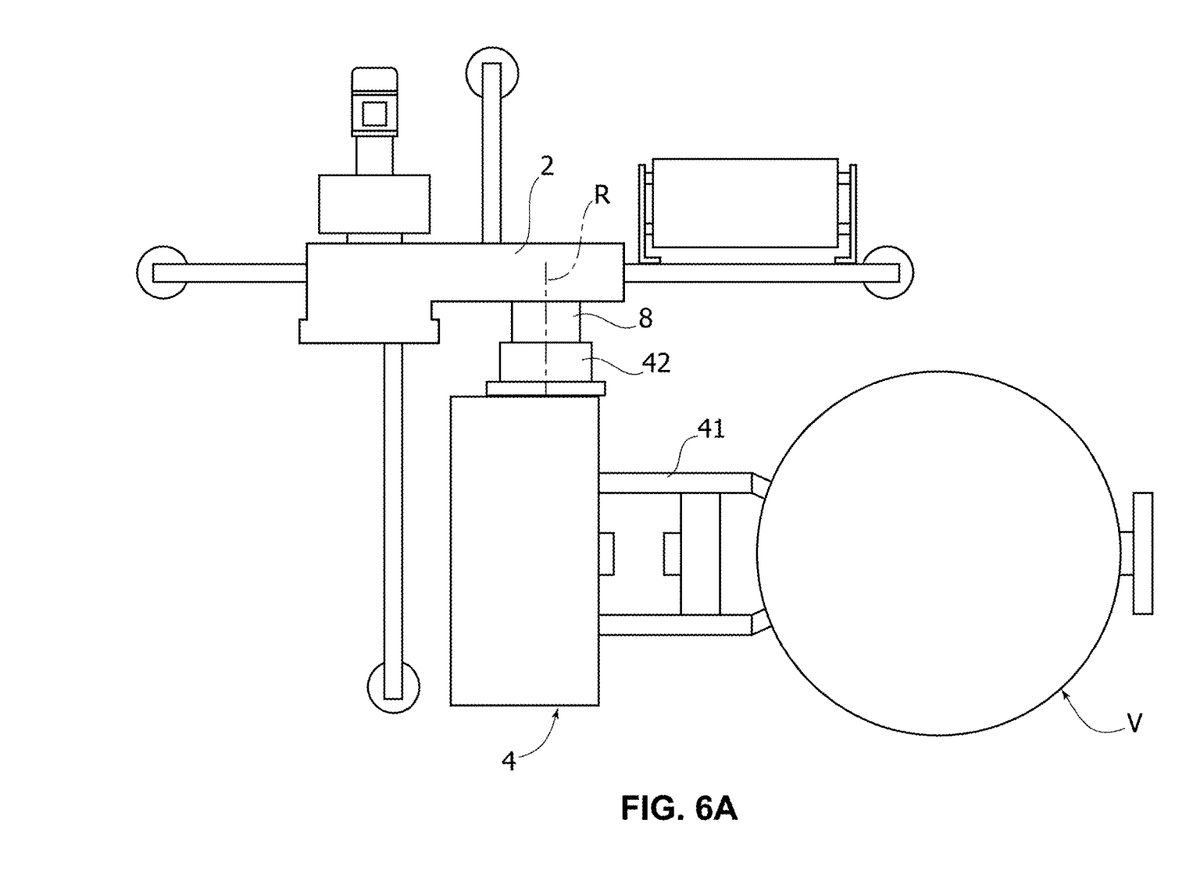
FIGS. 6A and 6B illustrate the system described herein, in which the overturning unit is mounted on the supporting structure according to two respective different configurations.
Figure 6B:
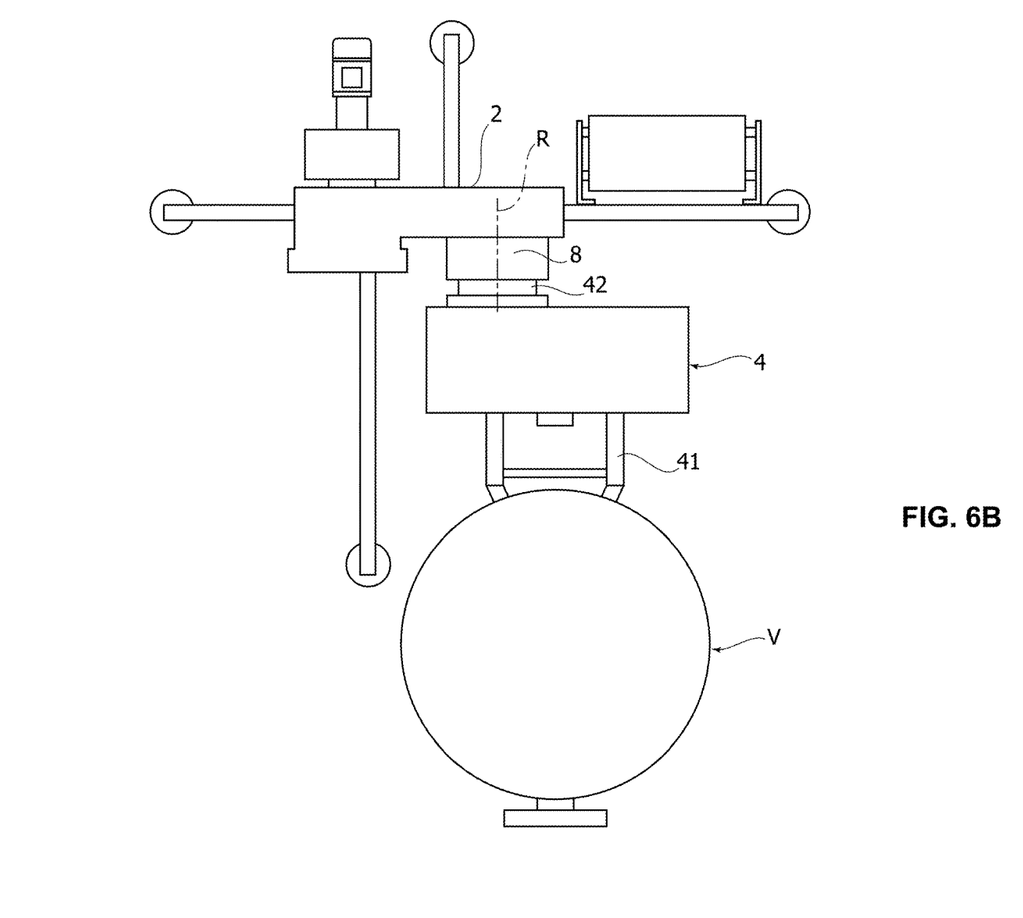

FIGS. 6A and 6B show, instead, the further possibility afforded by the system described herein of varying also the type of loading of the tank on the system, in particular from a lateral-loading configuration (FIG. 6A) to a front-loading configuration (FIG. 6B), and vice versa. This is obtained simply by providing two distinct types of overturning unit 4, each dedicated to one of the two loading configurations. The two units 4 are distinguished from one another mainly in the orientation assumed by their respective platform 41 for raising the tank with respect to the respective portion 42 for attachment of the unit 4 to the slide 8. In the unit of FIG. 6A, the platform 41 is set according to an orientation substantially orthogonal to the attachment portion 42, whereas, in the unit of FIG. 69, the former is set substantially parallel to the latter.

Finally, it is clear that the system described herein can be used for turning over tanks belonging to any machine for treating foodstuff products (for example, leavening machines) and not only tanks of kneading machines.

Of course, without prejudice to the principle of the invention, the details of construction and the embodiments may vary, even significantly, with respect to what has been illustrated herein purely by way of non-limiting example, without thereby departing from the scope of the invention, as this is defined in the annexed claims. It may be noted, in particular, that some embodiments of the invention may envisage also the use of just one of the two operating parameters K and Ω referred to above, which may vary according to the type of dough.

The invention claimed is:

1. A system for overturning tanks of kneading machines, comprising:
   a supporting structure;
   an overturning unit, which is mobile along said structure between a lowered position and a raised position and can turn about an axis transverse to the direction of raising of said unit;
   an actuation system for driving the movement of said unit between said lowered position and said raised position; and
   a further actuation system provided for governing the movement of rotation of said unit independently of said movement between said lowered position and said raised position;
   a control unit configured for governing said actuation system and controlling the speed of the movement of translation of said unit between said lowered position and said raised position, and wherein said control unit is configured for governing said further actuation system and controlling the speed of the movement of rotation of said unit about said axis of rotation, and wherein:
   said control unit configured for governing said actuation system and said further actuation system according to at least one of the following operating parameters:
   a parameter K representing the ratio between said speed of translation and said speed of rotation; and/or
   a parameter Ω corresponding to the total rotation angle of the movement of overturning of the tank,
   wherein said parameter K and said parameter Ω are variable according to the value of density of said dough;
   wherein said control unit is configured for executing a program of selection of the dough that proposes a list of different types of dough among which the operator can select the desired one, and wherein said control unit is configured for governing said actuation system and/or said further actuation system according to said at least one of said operating parameters that is variable according to a type of dough selected.

2. The system according to claim 1, wherein said parameter K is represented by the ratio of said speed of translation to said speed of rotation, and wherein said control unit is configured for governing said actuation system and said further actuation system according to said operating parameter, which is variable according to the density of said dough,
   in such a way that:
   for a type of dough having a first density, said parameter has a first value; and
   for a second type of dough having a second density lower than said first density, said parameter has a second value lower than said first value.

3. The system according to claim 1, wherein said control unit is configured for governing said further actuation system according to said operating parameter Ω, in such a way that:
   for a type of dough having a first density, said parameter has a first value; and
   for a second type of dough having a second density lower than said first density, said parameter has a second value higher than said first value.

4. The system according to claim 1, comprising a slide mounted on said structure, which is mobile between said lowered position and said raised position, on which said unit is rotatably mounted about said transverse axis.

5. The system according to claim 4, wherein said unit is configured for receiving and connecting to itself the tank to be turned over, and wherein said unit is mounted on said transverse axis according to a configuration such that said axis comes to be located below the bottom of said tank connected to said unit.

6. The system according to claim 1, wherein said first system comprises chain-movement means and a motor provided for driving said means, and wherein said slide is connected to said chain means.

7. The system according to claim 1, wherein said further actuation system comprises a motor and geared-transmission means that connect said motor in rotation to said unit.

8. The system according to claim 1, wherein said control unit comprises a programming module on which the operator can intervene for setting the various operating parameters of each of said first and second actuation systems.

9. The system according to claim 1, wherein said supporting structure has an overall column or pillar configuration, and is supported laterally by side supports designed to bestow on said structure a pre-set inclination with respect to the vertical direction.

10. The system according to claim 9, wherein said inclination may be varied, preferably between 0° and 45° by interchanging appropriate side supports dedicated to the respective inclinations envisaged in said system.

11. The system according to claim 1, wherein said overturning unit has an attachment portion that is to be connected to said slide and a platform or similar supporting elements for raising said tank, wherein said attachment portion and said platform have a first given orientation with respect to one another, said orientation establishing a frontal tank-loading configuration,
   wherein a further overturning unit can be connected to said slide instead of said first overturning unit, wherein said further overturning unit the attachment portion and said platform have a second given orientation different from said first orientation, which establishes a lateral tank-loading configuration.

12. A method for turning over a tank, in particular the tank of a kneading machine, in a system for overturning tanks, wherein said system comprises:
   a supporting structure;
   an overturning unit, which is mobile along said structure between a lowered position and a raised position and can turn about an axis transverse to the direction of raising of said unit; and
   raising and/or lowering, and rotating said unit, via selective driving of two respective motion-actuation systems, which are distinct and independent of one another, one associated to the motion of rotation and the other associated to the motion of raising and lowering;
   a control unit configured for governing said actuation system and controlling the speed of the movement of translation of said unit between said lowered position and said raised position, and wherein said control unit is configured for governing said further actuation system and controlling the speed of the movement of rotation of said unit about said axis of rotation, and wherein:
   said control unit is configured for governing said actuation system and said further actuation system according to at least one of the following operating parameters:

a parameter K representing the ratio between said speed of translation and said speed of rotation; and/or a parameter Ω corresponding to the total rotation angle of the movement of overturning of the tank, wherein said parameter K and said parameter Ω are variable according to [the type of dough, in particular according to] the value of density of said dough wherein said control unit is configured for executing a program of selection of the dough that proposes a list of different types of dough among which the operator can select the desired one, and wherein said control unit is configured for governing said actuation system and/or said further actuation system according to said at least one of said operating parameters that is variable according to the type of dough selected.

13. The method according to claim 12, further comprising:

governing the speed of said movement of raising and/or lowering and the speed of said movement of rotation so that they are in a given ratio that is variable according to the type of dough contained in said tank, and/or regulating the total rotation of the movement of overturning of the tank according to the type of dough contained in said tank.

14. The method according to claim 12, further comprising regulating one or more parameters of said movement of rotation and of said movement of raising/lowering, particularly, position, activation/deactivation times, speed, acceleration/deceleration, according to the type of dough contained in said tank.

15. The system according to claim 2, wherein said control unit is configured for governing said further actuation system according to said operating parameter Ω, in such a way that:

for a type of dough having a first density, said parameter has a first value; and for a second type of dough having a second density lower than said first density, said parameter has a second value higher than said first value.

16. The system according to claim 2, wherein said control unit is configured for executing a program of selection of the dough that proposes a list of different types of dough among which the operator can select the desired one, and wherein said control unit is configured for governing said actuation system and/or said further actuation system according to said at least one of said operating parameters that is variable according to the type of dough selected.

17. The system according to claim 3, wherein said control unit is configured for executing a program of selection of the dough that proposes a list of different types of dough among which the operator can select the desired one, and wherein said control unit is configured for governing said actuation system and/or said further actuation system according to said at least one of said operating parameters that is variable according to the type of dough selected.

18. The method according to claim 13, further comprising regulating one or more parameters of said movement of rotation and of said movement of raising/lowering, particularly, position, activation/deactivation times, speed, acceleration/deceleration, according to the type of dough contained in said tank.

19. A system for overturning tanks of kneading machines, comprising:

a supporting structure;

an overturning unit, which is mobile along said structure between a lowered position and a raised position and can turn about an axis transverse to the direction of raising of said unit;

an actuation system for driving the movement of said unit between said lowered position and said raised position; and a further actuation system provided for governing the movement of rotation of said unit independently of said movement between said lowered position and said raised position;

a control unit configured for governing said actuation system and controlling the speed of the movement of translation of said unit between said lowered position and said raised position, and wherein said control unit is configured for governing said further actuation system and controlling the speed of the movement of rotation of said unit about said axis of rotation, and wherein:

said control unit configured for governing said actuation system and said further actuation system according to at least one of the following operating parameter:

a parameter K representing the ratio between said speed of translation and said speed of rotation; and a parameter Ω corresponding to the total rotation angle of the movement of overturning of the tank, wherein said parameter K and said parameter Ω are variable according to the value of density of said dough;

wherein said parameter K is represented by the ratio of said speed of translation to said speed of rotation, and wherein said control unit is configured for governing said actuation system and said further actuation system according to said operating parameter, which is variable according to the density of said dough, in such a way that:

for a type of dough having a first density, said parameter has a first value; and for a second type of dough having a second density lower than said first density, said parameter has a second value lower than said first value;

wherein said control unit is configured for governing said further actuation system according to said operating parameter Ω, in such a way that:

for a type of dough having a first density, said parameter has a first value;

for a second type of dough having a second density lower than said first density, said parameter has a second value higher than said first value; and wherein said control unit is configured for executing a program of selection of the dough that proposes a list of different types of dough among which the operator can select the desired one, and wherein said control unit is configured for governing said actuation system and/or said further actuation system according to said at least one of said operating parameters that is variable according to the type of dough selected.

* * * * *